HIGH SPEED-HIGH IMPEDANCE ELECTRICAL SWITCH

Filed Dec. 27, 1966

INVENTORS.
JOHN W. BECK
CHARLES J. STEELE
BY
ATTORNEY

1

3,463,993
HIGH SPEED-HIGH IMPEDANCE ELECTRICAL SWITCH
John William Beck and Charles John Steele, San Jose, Calif., assignors to International Business Machines Corporation, Armonk, N.Y., a corporation of New York
Filed Dec. 27, 1966, Ser. No. 604,942
Int. Cl. H03k 3/26, 19/08
U.S. Cl. 320—1 14 Claims

ABSTRACT OF THE DISCLOSURE

The high speed sampling and the subsequent storage of many electric signals at substantially constant values over extended time periods as in process controlling systems is enhanced by interposing low speed-high impedance relay switching contacts and high speed-low impedance semiconductor switching elements in series between the sources of electric signals and the corresponding storage capacitors. The relay contacts are closed a short time before the semiconductor elements are rendered conducting for sampling and reopened a short time after the semiconductor elements are blocked so that the charges transferred to the respective capacitors do not leak off through the low impedance paths of the semiconductor elements.

This invention relates to electrical switching circuitry and, more particularly, to high speed, high impedance switching circuitry for particular utilization with an electrical charge storage circuit.

In applications such as the computer control of physical processes, analog voltages are employed to operate certain process transducers. It is frequently desirable to generate or sample those voltages in a very rapid manner, store them on a plurality of charge storage elements, and then selectively discharge the storage elements as the analog voltages are required. Present day process control technology generally uses an associated digital computer to generate or sample the analog voltages and to control the multiplexing of them onto the charge storage elements. That multiplexing operation requires switching circuitry. In addition, the computer is used to cyclically regenerate the analog signal so as to maintain a relatively constant charge on the charge storage elements.

To make efficient use of the associated digital computer, the switching circuitry should operate at as high a speed as possible and in a reliable manner. Furthermore, the switching circuitry must prevent the stored charges from leaking away during a possible computer failure. A great number of charges are frequently stored in separate charge storage circuits, and each charge plays a role in controlling the process. The possibility of those charges dissipating during a period of computer downtime could result in serious consequences for the process being controlled. For example, a number of transducers controlling various pressures and temperatures could be rendered inoperable and safety hazards could be created; alternatively, a capital loss to the process owner could occur. The problem faced by the prior art was that no single switch offered the speed required as well as long-term charge isolation.

A solid state switch by itself offers high switching speeds, but does not provide the necessary charge isolation should a computer failure occur. An electromechanical switch provides the necessary charge isolation during a computer failure, but its switching speed is slower than that of a solid state switch. Its failure-free life is lower, also. Thus, neither switching element by itself is completely satisfactory.

2

Prior art solutions to this problem have been generally complex and expensive or unsatisfactory in other respects. For example, they have included the provision of resistor ladder networks along with diode switching. The ladder-diode approach is characterized by high cost due to the precision resistors necessary for the resistor ladder network. Furthermore, it is difficult to fabricate. This is typical of the generally unsatisfactory approach of the prior art.

Accordingly, it is a general object of this invention to provide an improved switching circuit for utilization with charge storage circuits.

A more particular object of this invention is to provide improved switching circuitry characterized by extremely rapid switching and long-term charge isolation.

Another more particular object of this invention is to provide improved switching circuitry characterized by high speed switching and long-term charge isolation as well as a long life for the switching circuitry.

Still another object of this invention is to provide switching circuitry combining solid state components with electromechanical components.

Yet another object of this invention is to provide switching circuitry, which is well adapted for use in computer-directed multiplexing and storage of analog voltages.

A further object of this invention is to provide switching circuitry of the type described immediately above wherein long-term isolation of a stored charge is provided during periods of computer downtime.

Briefly stated, and in accordance with one aspect of our invention, improved switching circuitry for utilization with a charge storage circuit has been provided. That improved switching circuitry comprises a high speed, low impedance switch (such as a solid state device) in series with a low speed, high impedance switch (such as an electromechanical switch). The switching circuitry, in turn, is in electrical connection with charge storage circuitry. The solid state switch is rendered conductive in order to transfer an analog voltage from an analog voltage source, through a conducting electromechanical switch, to an associated charge storage circuit, thereby accomplishing the switching at a high speed. The solid state switch is then rendered nonconductive, and prevents leakage of the charge from the charge storage circuit for a brief time. Should the solid state switch be rendered completely inoperative for a longer time due to some reason like a computer failure, the electromechanical switch is opened. A high impedance leakage path is thereby presented to the charge storage circuitry, and the charge is maintained in an essentially undiminished state on that charge storage circuitry for a relatively long time.

Our invention then combines the best of two components; namely, the high speed switching normally associated with solid state switches and the high impedance characteristic of open electromechanical switches. Each characteristic is utilized when it is most needed; the high speed switching of the solid state switch is available during normal operation of the circuitry, while the high impedance of the electromechanical switch is called upon only when there is a failure of the associated equipment.

These advantages are obtained through the circuitry of our invention without resorting to the complex arrangement of components known to the prior art. Those complex arrangements of components (e.g., ladder networks and associated registers) were unattractive for a number of reasons, including difficulty of fabrication and difficulty of repair. By contrast, our invention employs relatively few components; those components are not unduly expensive; those components are relatively easy to fabricate; and, lastly, those components are easy to repair should repair become necessary. With respect to the latter point, it is noted that the expected lifetime of solid state switches is significantly higher than that of electromechanical switches. Since the solid state switches in our invention are utilized much more frequently than the electromechanical switches, this increased lifetime of the solid state switch is a distinct advantage. As an incidental point, the circuitry of our invention can be encapsulated readily in protective plastic so as to insulate it from the contaminating effect of an ambient atmosphere. This is important, since this type of circuitry is frequently used in process control applications where the circuitry is near to a physical process with its attendant fumes, etc.

The foregoing and other objects, features, and advantages of our invention will be apparent from the following more particular description of a preferred embodiment of the invention, as illustrated in the accompanying drawings.

Figure 1:
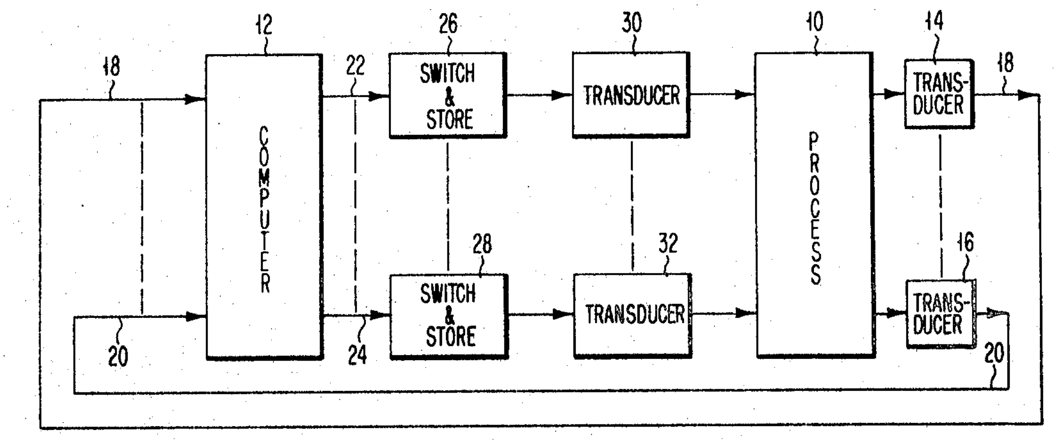
FIGURE 1 shows, in block diagram form, our invention in an operating system of a type suited to utilizing its desirable characteristics.

With reference, then, to FIGURE 1, a physical process 10 under the control of an associated computer 12 is shown. Process 10 is characterized by a plurality of controlled variables, whose values are measured by associated transducers 14–16; corresponding digital signals are generated on lines 18–20 leading into computer 12. Computer 12 operates upon these signals on lines 18–20 and generates control signals on lines 22–24 for correcting, or reestablishing, the values of the measured variables. In normal practice, these control signals are usually in the form of analog voltages, each of which is multiplexed onto a storage element by means of switch and store circuitry 26–28; thus, a representation of the input electrical signal is stored on the storage element. The analog voltages are then made available subsequently to associated transducers 30–32. Similarly, in normal practice, computer 12 cyclically regenerates these analog voltages so as to keep the charge on a storage element at a relatively constant level. Transducers 30–32 serially accept these analog voltages from the charge storage elements and set valves, temperatures, etc. for process 10. It is the structure and operation of one switch and store circuit 26 that embodies the novel teaching of our invention.

Figure 2:
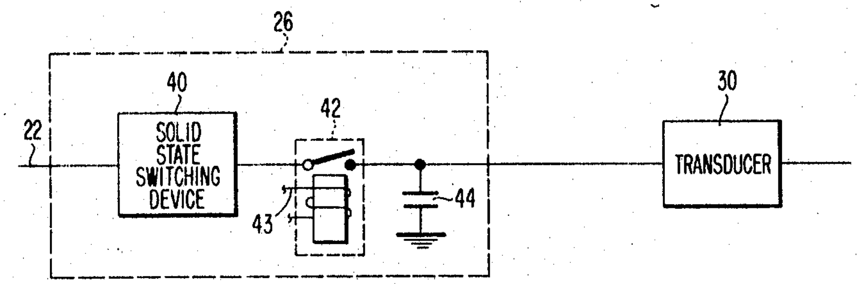
FIGURE 2 shows in combined block diagram-schematic form, the novel aspects of our invention in more detail.

FIGURE 2 shows in a combined block diagram-schematic form the novel aspects of our invention in more detail. The structure of one switch and store circuit 26 is shown within dotted lines. Each such switch and store circuit comprises at least one solid state switching device 40 in series with at least one electromechanical switching device 42 which, by way of example, may be a relay. Connected in series with solid state switching device 40 and electromechanical switch 42 is an electrical charge storage structure, such as grounded capacitor 44. In essence, the three structural items (solid state switching device 40, electromechanical switch 42 and capacitor 44) comprise a switch and store circuit 26.

In operation, an analog voltage signal, for example, is developed on line 22 by computer 12. Computer 12 in this example supplies the necessary operating potential to a terminal of solid state switching device 40 and to the coil 43 of electromechanical switch 42 so as to render solid state switching device 40 transitorily conductive and electromechanical switch 42 continuously closed. This operation is described more fully with reference to FIGURE 3. The analog signal on line 22 then passes through solid state switching device 40 and electromechanical switch 42; it is stored on capacitor 44. Solid state switching device 40 is then rendered nonconductive (for example, by removal of the necessary operating potential) and the charge is stored on capacitor 44 until such time as transducer 30 requires it, or can utilize it.

With continued reference to the structure and operation of the apparatus shown in FIGURE 2, the high speed switching characteristics of solid state switching device 40 are used to transfer the analog voltage signal from line 22 onto capacitor 44. In normal operation, the impedance offered to a charge on capacitor 44 by solid state switching device 40 is sufficient to prevent leakage in the reverse direction for a limited time. Also, in normal operation, the charge on capacitor 44 is cyclically replenished. However, should a failure of computer 12 occur, the charge would soon leak off capacitor 44 through device 40, and there is no provision for recharging capacitor 44. But, when this computer failure occurred, the computer can no longer supply current to the coil 43 of electromechanical switch 42. Then, normally open switch 42, which had been held closed by current in its coil 43, does in fact become opened. A high impedance path is thus presented to the charge stored on capacitor 44, and leakage from capacitor 44 is effectively prevented during the period of computer downtime. This would enable the process to be stabilized until maintenance personnel could restore power or repair the computer. When computer 12 goes back on line, necessary potentials are once again supplied to solid state switching device 40 and coil 43 of electromechanical switch 42 so as to bring them back into their normally operable condition.

Figures 3, 4:
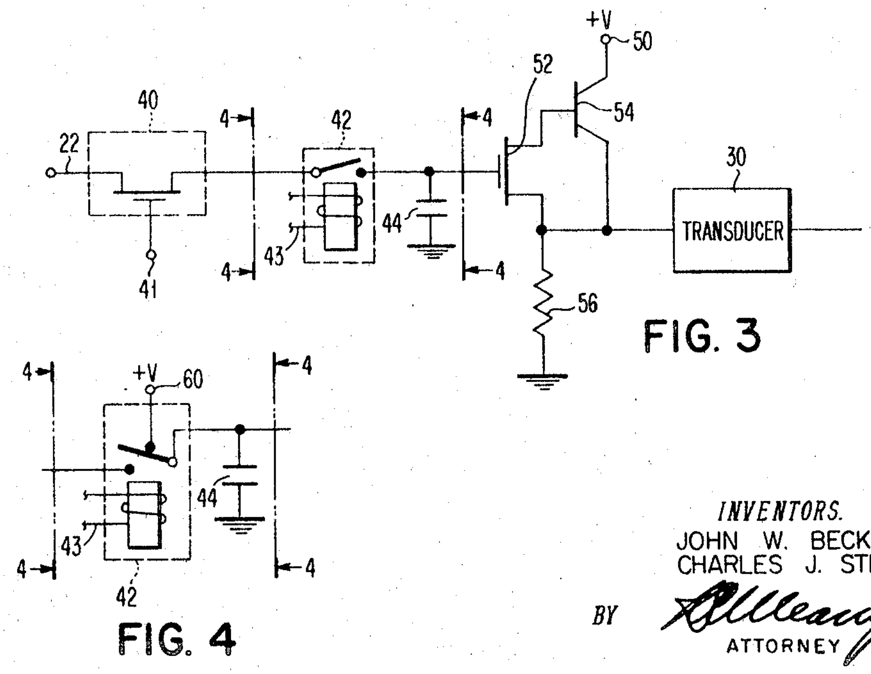
FIGURE 3 shows a circuit diagram of a typical embodiment of our invention.
FIGURE 4 shows an alternative embodiment of our invention for recharging a storage element during a malfunction of associated apparatus.

FIGURE 3 shows a circuit diagram of exemplary apparatus for practicing our invention. The structure shown therein is not meant to be limiting; rather, it is given as one example of practicing our invention. Solid state switching device 40 is shown as a field effect transistor; two Siliconix 2N3631 field effect transistors wired in series and functioning as a single switch are satisfactory. Other solid state switching devices can be employed, so long as they share the characteristics of a high switching speed and a short-term ability to prevent charge leakage from capacitor 44 when operating normally. Connected in series with the solid state switching device 40 is electromechanical switch 42 which may in practice be an IBM relay #765654, although other equivalent electromechanical switches may be employed with success. Also connected in series with both field effect transistor 40 and relay 42 is a charge storage capacitor 44 which may have a capacitance value of 1 microfarad. Other more sophisticated arrangements of circuitry for storing charges corresponding to analog voltages may similarly be employed with success. Linear amplifier circuitry comprising a positive voltage source 50, a transistor 52, which may be an IBM 136, and a field effect transistor 54 (like Siliconix SU580) with associated resistor 56 is also shown for actually gating out the developed analog signal from capacitor 44 into a transducer 30.

In the example set forth in FIGURE 3, a typical switching time for field effect transistor 40 is in the order of microseconds for an analog voltage signal of 1–5 volts on line 22, while the switching time for relay 42 is in the order of milliseconds. Field effect transistor 40 requires a pulse of roughly 10–20 volts on terminal 41 to render it conductive. Likewise, a voltage of roughly 24 volts across coil 43 keeps relay 42 closed. The voltage at terminal 50 could be +30 volts. Resistor 56 may have a value of 10,000 ohms. All these values are merely illustrative and may require slight modification by one skilled in the art to which the invention pertains. Although it is preferable to have solid state switching device 40 physically ahead of electromechanical switch 42 in some instances, it may be preferable in other instances to reverse their order; it is only necessary that they be wired in series.

FIGURE 4 shows a modification which positively drives capacitor 44 into its charged state when power is removed from the coil 43 of electromechanical switch 42. By modifying the circuitry within lines 4—4 of FIGURE 3, a potential source 60 can be switched into circuit with capacitor 44 during a failure of an associated computer. Then, capacitor 44 is kept at a proper level regardless of how long it takes for the malfunction of the associated equipment to be repaired. Operation of the remainder of the circuitry is essentially the same.

While the invention has been particularly shown and described with reference to a preferred embodiment thereof, it will be understood by those skilled in the art that the foregoing and other changes in form and details may be made therein without departing from the spirit and scope of the invention.

We claim:

1. Apparatus for sampling an electrical signal and storing said electrical signal at substantially constant value for an extended time comprising in combination:

an electrical charge storage means for storing a charge representing said electrical signal;

solid state normally open switching means in series with said charge storage means for transferring a charge representing said electrical signal to said charge storage means; and electromechanical normally open switching means, in series with, and connected between, said solid state switching means and said charge storage means, for presenting a high impedance path to said charge on said charge storage means when said solid state switching means is rendered inoperative;

said electromechanical switching means being closed before said solid state switching means is closed, and reopened after said solid state switching means is reopened.

2. Apparatus of the type set forth in claim 1 wherein said solid state switching means comprises a solid state device.

3. Apparatus of the type set forth in claim 2 wherein said solid state switching means comprises a field effect transistor.

4. Apparatus of the type set forth in claim 1 wherein said electromechanical switching means comprises a relay.

5. Apparatus of the type set forth in claim 1 wherein said solid state switching means comprises a field effect transistor and said electromechanical switching means comprises a relay.

6. Apparatus for sampling an analog voltage signal and storing a charge representing said analog voltage signal at substantially constant value for an extended time comprising in combination:

analog voltage signal generating means for generating an analog voltage signal;

charge storage means responsive to said analog voltage signal generating means for storing a charge representing said analog voltage signal;

solid state normally open switching means for switching said analog voltage signals to said charge storage means;

control means for selectively rending said solid state switching means conductive; and normally open electromechanical switching means responsive to a malfunction of said control means for electrically isolating said charge storage means, thereby remaining open in high impedance state and preventing said charge from leaking away from said charge storage means during said malfunction of said control means.

7. Apparatus of the type set forth in claim 6 wherein said solid state switching means comprises a solid state device.

8. Apparatus of the type set forth in claim 7 wherein said solid state switching means comprises a field effect transistor.

9. Apparatus of the type set forth in claim 6 wherein said means responsive to a malfunction of said control means comprises an electromechanical switching device.

10. Apparatus of the type set forth in claim 9 wherein said electromechanical switching device comprises a relay.

11. Apparatus of the type set forth in claim 6 wherein said solid state switching means comprises a field effect transistor and said means responsive to a malfunction of said control means comprises a relay.

12. Apparatus for sampling an electrical signal and storing a charge representing said electrical signal at substantially constant value for an extended time comprising in combination:

electrical signal generating means for generating an electrical signal;

charge storage means responsive to said electrical signal generating means for storing a charge representing said electrical signal;

high speed, low impedance normally open switching means for switching said electrical signals to said charge storage means;

control means for selectively rendering said high speed, low impedance switching means conductive; and low speed, high impedance normally open switching means responsive to a malfunction of said control means for electrically isolating said charge storage means from said high speed, low impedance switching means, thereby remaining open in high impedance state and preventing said charge from leaking away from said charge storage means during said malfunction of said control means.

13. Apparatus of the type set forth in claim 12 wherein said high speed, low impedance switching means comprises a solid state device and said low speed, high impedance means comprises an electromechanical switch.

14. Apparatus of the type set forth in claim 13 wherein said solid state device comprises a field effect transistor and said electromechanical switch comprises a relay.

References Cited

UNITED STATES PATENTS

| | | | |
|---|---|---|---|
| 2,902,674 | 9/1959 | Billings et al. | 320—1 X |
| 3,158,758 | 11/1964 | Pearson | 307—246 |
| 3,214,601 | 10/1965 | Christopherson | 340—174 |
| 3,274,444 | 9/1966 | Boudreau et al. | 317—9 |
| 3,321,747 | 5/1967 | Adamson | 317—9 X |
| 3,322,974 | 5/1967 | Ahrons et al. | 307—304 X |
| 3,406,346 | 10/1968 | Wanlass | 307—304 X |

BERNARD KONICK, Primary Examiner

JOSEPH F. BREIMAYER, Assistant Examiner

U.S. Cl. X.R.

307—238, 304; 317—9; 340—173